(12) United States Patent
Fu

(10) Patent No.: US 10,761,930 B2
(45) Date of Patent: Sep. 1, 2020

(54) MEMORY WITH ERROR CORRECTION FUNCTION THAT IS COMPATIBLE WITH DIFFERENT DATA LENGTH AND AN ERROR CORRECTION METHOD

(71) Applicant: XI'AN UNIIC SEMICONDUCTORS CO., LTD., Xi'an Shaanxi (CN)

(72) Inventor: Ni Fu, Xi'an Shaanxi (CN)

(73) Assignee: Xi'an UNIIC Semiconductors Co., Ltd., Xi'an, Shaanxi (CN)

( * ) Notice: Subject to any disclaimer, the term of this patent is extended or adjusted under 35 U.S.C. 154(b) by 98 days.

(21) Appl. No.: 15/982,297

(22) Filed: May 17, 2018

(65) Prior Publication Data
US 2018/0336094 A1 Nov. 22, 2018

(30) Foreign Application Priority Data
May 17, 2017 (CN) .......................... 2017 1 0348736

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01); *G06F 11/1048* (2013.01)

(58) Field of Classification Search
CPC ............. G06F 11/1076; G06F 11/1048; G06F 3/0673; G06F 3/0659; G06F 3/0619; G11C 29/42
USPC ........................................................ 714/764
See application file for complete search history.

(56) References Cited

U.S. PATENT DOCUMENTS

| 2009/0063729 | A1* | 3/2009 | Gower | G06F 11/1048 710/35 |
| 2013/0332789 | A1* | 12/2013 | Troia | G06F 11/1048 714/752 |
| 2014/0122974 | A1* | 5/2014 | Yun | G06F 11/1004 714/773 |
| 2014/0317470 | A1* | 10/2014 | Chung | G06F 11/1076 714/764 |
| 2017/0147431 | A1* | 5/2017 | West | G06F 3/0619 |
| 2018/0060171 | A1* | 3/2018 | Suh | G06F 3/064 |

* cited by examiner

*Primary Examiner* — James C Kerveros
(74) *Attorney, Agent, or Firm* — Leydig, Voit & Mayer, Ltd.

(57) ABSTRACT

The present invention relates to a memory with error correction function, comprising a data array, an ECC array, an ECC encoding module, an ECC decoding module, a first data selection module, a second data selection module and a data output module; wherein when data is being written, the first data selection module receives the data to be written, and determines whether to receive the data from the data array in response to a control signal that affects the length of the data; when data is being read, the second data selection module controls the length of the data output from the data output module in response to the control signal that affects the length of the data. The invention further relates to a method of correcting errors in a memory.

12 Claims, 3 Drawing Sheets

MEMORY WITH ERROR CORRECTION FUNCTION THAT IS COMPATIBLE WITH DIFFERENT DATA LENGTH AND AN ERROR CORRECTION METHOD

CROSS-REFERENCE TO RELATED APPLICATIONS

This application claims priority under 35 USC 119(a) to Chinese Application No. 201710348736.1, filed May 17, 2017, which is hereby incorporated by reference in its entirety.

TECHNICAL FIELD

The present invention relates to a memory with error correction function and a method of correcting errors in the memory.

BACKGROUND ART

ECC (i.e. Error Correction Code) can be used to detect and correct erroneous data by adding parity bits to data bits of a certain length. The conventional read and write processes for memory with error correction function are shown as FIGS. 1-2. FIG. 1 schematically shows a write process. A data array 1 is used to store data, and an ECC array 2 is used to store parity bits of ECC. When N-bit data are written into the memory from the system, M-bit parity bits are generated by an ECC encoding module 3 using the N-bit data, and then the N-bit data together with the M-bit parity bits are written into the corresponding memory arrays. The data length N is greater than zero, and is less than or equal to the data length for performing one read-write operation in the memory. The length M of the parity bits is greater than zero, and its value depends on the selected ECC algorithm.

FIG. 2 schematically shows a read process. N-bit data and M-bit parity bits are read from the corresponding memory arrays, and then are transferred to an ECC decoding module 4 after being amplified. The ECC decoding module 4 can detect and correct erroneous data, and read the corrected N-bit data.

From the write process in FIG. 1, it can be known that when the ECC encoding module 3 generates M-bit parity bits, the data length N are required, which is determined by the selected ECC algorithm. Nevertheless, with respect to memory, the lengths of the valid input data are not unchanged. For example, there are following specifications in Dynamic Random Access Memory (DRAM): if there is Burst Chop Mode (hereinafter referred as "BC mode"), the data length will vary such that the data length is less than N; or for structure with different data lengths, for example in the modes of X4, X8, X16 and so on, the data length will vary as a function of the external control such that the data length is not equal to N. Once an ECC algorithm is selected, the data length required by the corresponding ECC encoding module is determined, and if the data length varies, the parity bits of ECC cannot be generated successfully. Where a minimum data length could be found under all the constraints that may occur, and according to such a minimum data length, the ECC algorithm is selected, all of the modes can be supported. But if the minimum data length is 8, even for the most efficient Hamming code, at least 4-bit parity bits are required, which may increase at least 50% of the memory array area in order to store parity bits of ECC. This leads to a dramatic increase in the cost of memory, and reduces the flexibility and efficiency in the selection of ECC algorithm.

Therefore, there is a need to provide a memory with error correction function that is compatible with different data lengths.

SUMMARY OF THE INVENTION

Therefore, according to a first aspect of the present invention, there is provided a memory with error correction function, comprising a data array, an ECC array, an ECC encoding module, an ECC decoding module, a first data selection module, a second data selection module and a data output module;

wherein when data is being written, those modules perform the following operations: the data array is configured to store the data to be written; the first data selection module is configured to receive the data to be written, and in response to a control signal that affects the length of the data to determine whether to further receive the data from the data array; the ECC encoding module is configured to receive the data output from the first data selection module, and to encode the data according to the ECC algorithm preset therein so as to generate parity bits; and the ECC array is configured to store the generated parity bits;

when data is being read, those modules perform the following operations: the data array is configured to output the stored data; the ECC array is configured to output the stored parity bits; the ECC decoding module is configured to receive simultaneously the data output from the data array and the parity bits output from the ECC array so as to detect and correct the data; the second data selection module is configured to generate a control signal for the data output module in response to the control signal that affects the length of the data; and the data output module is configured to receive the corrected data, and in response to the control signal for the data output module to control the length of the data output from the data output module.

According to a preferred embodiment, the control signal that affects the length of the data is a signal corresponding to X4, X8 or X16 mode or a signal corresponding to the combination of burst chop mode with one of X4, X8 and X16 modes.

According to a preferred embodiment, when data is being written, if the control signal that affects the length of the data is enabled, the first data selection module further receives the data from the data array, so as to combine the data from the data array with the data to be written to construct data required by the ECC algorithm preset in the ECC encoding module.

According to a preferred embodiment, when data is being written, if the control signal that affects the length of the data is disabled, without receiving the data from the data array while merely receiving the data to be written, the first data selection module is able to output data required by the ECC algorithm preset in the ECC encoding module.

According to a preferred embodiment, when data is being read, if the control signal for the data output module is enabled, the length of the data output from the data output module is inconsistent with that required by the ECC algorithm.

According to a preferred embodiment, when data is being read, if the control signal for the data output module is disabled, the length of the data output from the data output module is consistent with that required by the ECC algorithm.

According to a second aspect of the present invention, there is provided a memory with error correction function, comprising a data array, an ECC array, an ECC encoding module, an ECC decoding module, a data selection module and a data output module;

wherein when data is being written, those modules perform the following operations: the data array is configured to store the data to be written; the ECC encoding module is configured to receive the data from the data array, and to encode the data according to the ECC algorithm preset therein so as to generate parity bits; and the ECC array is configured to store the generated parity bits;

when data is being read, those modules perform the following operations: the data array is configured to output the stored data; the ECC array is configured to output the stored parity bits; the ECC decoding module is configured to receive simultaneously the data output from the data array and the parity bits output from the ECC array so as to detect and correct the data; the data selection module is configured to generate a control signal for the data output module in response to the control signal that affects the length of the data; and the data output module is configured to receive the corrected data, and in response to the control signal for the data output module to control the length of the data output from the data output module.

According to a preferred embodiment, the control signal that affects the length of the data is a signal corresponding to X4, X8 or X16 mode or a signal corresponding to the combination of burst chop mode with one of X4, X8 and X16 modes.

According to a preferred embodiment, when data is being read, if the control signal for the data output module is enabled, the length of the data output from the data output module is inconsistent with that required by the ECC algorithm.

According to a preferred embodiment, when data is being read, if the control signal for the data output module is disabled, the length of the data output from the data output module is consistent with that required by the ECC algorithm.

According to a third aspect of the present invention, there is provided a method of correcting errors in a memory, wherein the memory comprises a data array, an ECC array, an ECC encoding module, an ECC decoding module, a first data selection module, a second data selection module and a data output module, the method of correcting errors in the memory comprising:

when data is being written, the following steps are carried out: storing the data to be written in the data array; receiving the data to be written by the first data selection module, and determining whether to further receive the data from the data array by the first data selection module in response to a control signal that affects the length of the data; receiving the data output from the first data selection module by the ECC encoding module, and encoding the data by the ECC encoding module according to the ECC algorithm preset therein so as to generate parity bits; and storing the generated parity bits in the ECC array;

when data is being read, the following steps are carried out: outputting the stored data from the data array; outputting the stored parity bits from the ECC array; receiving simultaneously the data output from the data array and the parity bits output from the ECC array by the ECC decoding module so as to detect and correct the data; generating a control signal for the data output module by the second data selection module in response to the control signal that affects the length of the data; and receiving the corrected data by the data output module and in response to the control signal for the data output module, controlling the length of the data output from the data output module.

According to a preferred embodiment, the control signal that affects the length of the data is a signal corresponding to X4, X8 or X16 mode or a signal corresponding to the combination of burst chop mode with one of X4, X8 and X16 modes.

According to a preferred embodiment, when data is being written, if the control signal that affects the length of the data is enabled, the first data selection module further receives the data from the data array, so as to combine the data from the data array with the data to be written to construct data required by the ECC algorithm preset in the ECC encoding module.

According to a preferred embodiment, when data is being written, if the control signal that affects the length of the data is disabled, without receiving the data from the data array while merely receiving the data to be written, the first data selection module is able to output data required by the ECC algorithm preset in the ECC encoding module.

According to a preferred embodiment, when data is being read, if the control signal for the data output module is enabled, the length of the data output from the data output module is inconsistent with that required by the ECC algorithm.

According to a preferred embodiment, when data is being read, if the control signal for the data output module is disabled, the length of the data output from the data output module is consistent with that required by the ECC algorithm.

According to a fourth aspect of the present invention, there is provided a method of correcting errors in a memory, wherein the memory comprises a data array, an ECC array, an ECC encoding module, an ECC decoding module, a data selection module and a data output module, the method of correcting errors in the memory comprising:

when data is being written, the following steps are carried out: storing the data to be written in the data array; receiving the data from the data array by the ECC encoding module, and encoding the data by the ECC encoding module according to the ECC algorithm preset therein so as to generate parity bits; and storing the generated parity bits in the ECC array;

when data is being read, the following steps are carried out: outputting the stored data from the data array; outputting the stored parity bits from the ECC array; receiving simultaneously the data output from the data array and the parity bits output from the ECC array by the ECC decoding module so as to detect and correct the data; generating a control signal for the data output module by the data selection module in response to the control signal that affects the length of the data; and receiving the corrected data by the data output module, and in response to the control signal for the data output module, controlling the length of the data output from the data output module.

According to a preferred embodiment, the control signal that affects the length of the data is a signal corresponding to X4, X8 or X16 mode or a signal corresponding to the combination of burst chop mode with one of X4, X8 and X16 modes.

According to a preferred embodiment, when data is being read, if the control signal for the data output module is enabled, the length of the data output from the data output module is inconsistent with that required by the ECC algorithm.

According to a preferred embodiment, when data is being read, if the control signal for the data output module is disabled, the length of the data output from the data output module is consistent with that required by the ECC algorithm.

The memory and the method of correcting errors in the memory according to the present invention have at least the following advantages: being adaptive to any ECC algorithm, and thus gaining the more flexibility and efficiency in the selection of ECC algorithm; being compatible with different data lengths; being not affected by burst chop mode, X4, X8 and X16 modes; reducing the power dissipation; and being not influencing the functions and timing sequences of conventional write operation and read operation.

BRIEF DESCRIPTION OF THE DRAWINGS

The advantages and features of the present invention will become apparent from the embodiments described below with reference to the accompanying drawings, wherein.

DETAILED DESCRIPTION OF THE INVENTION

It should be understood that the specific examples described herein are intended to facilitate better understanding of the present invention and are not intended to limit the present invention.

Figure 1:
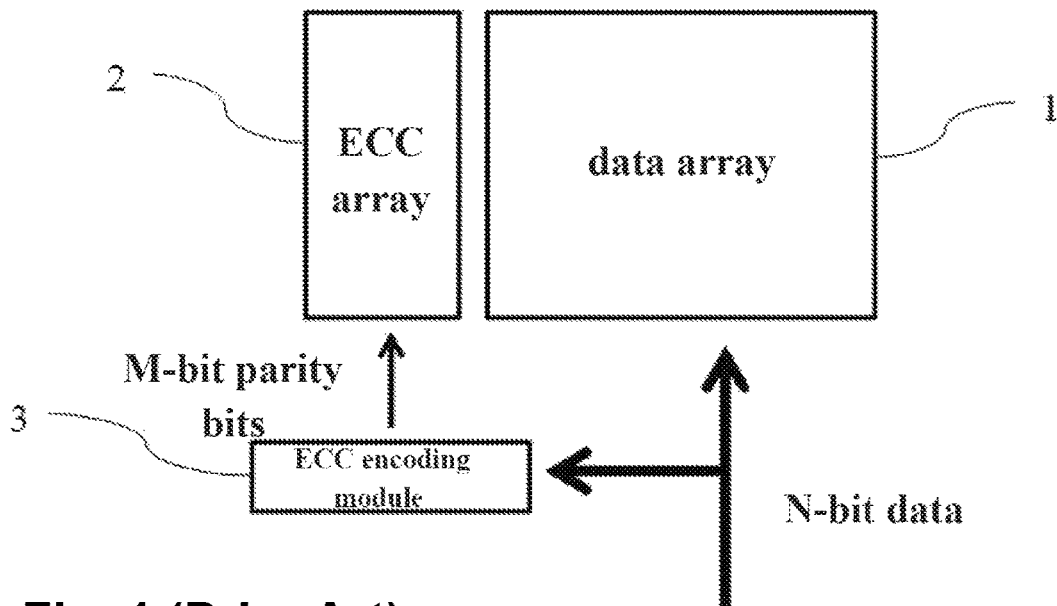
FIG. 1 schematically shows a write process of a memory.
Figure 2:
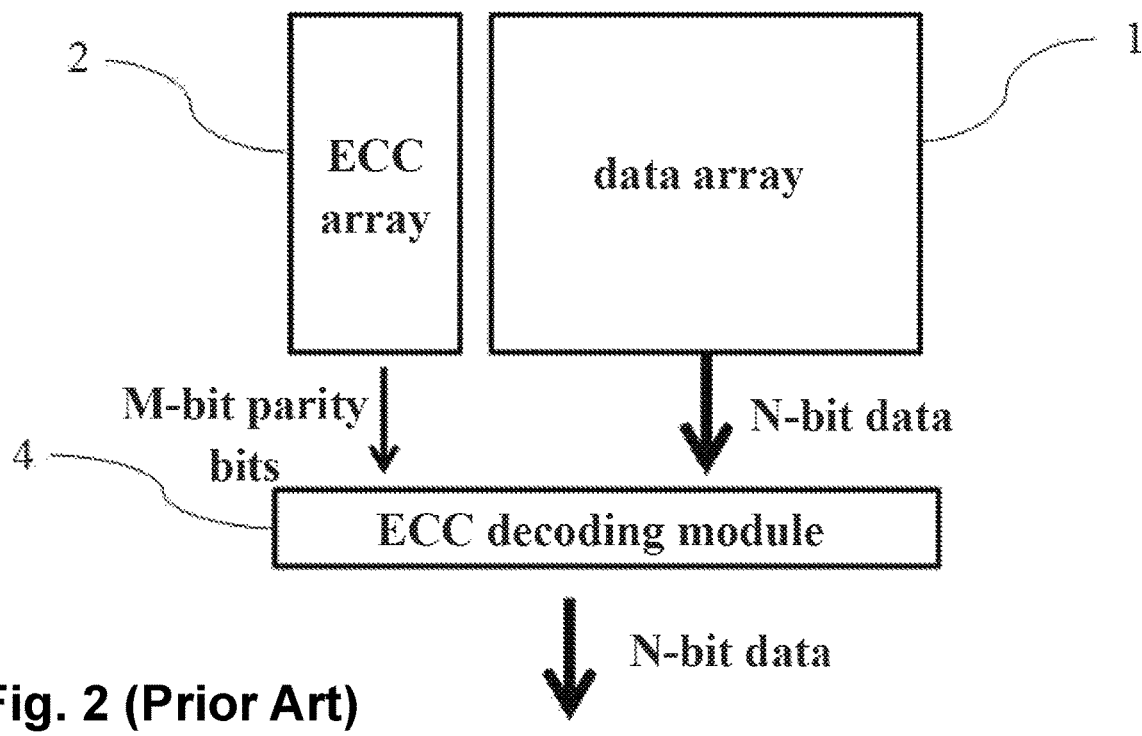
FIG. 2 schematically shows a read process of a memory.
Figure 3:
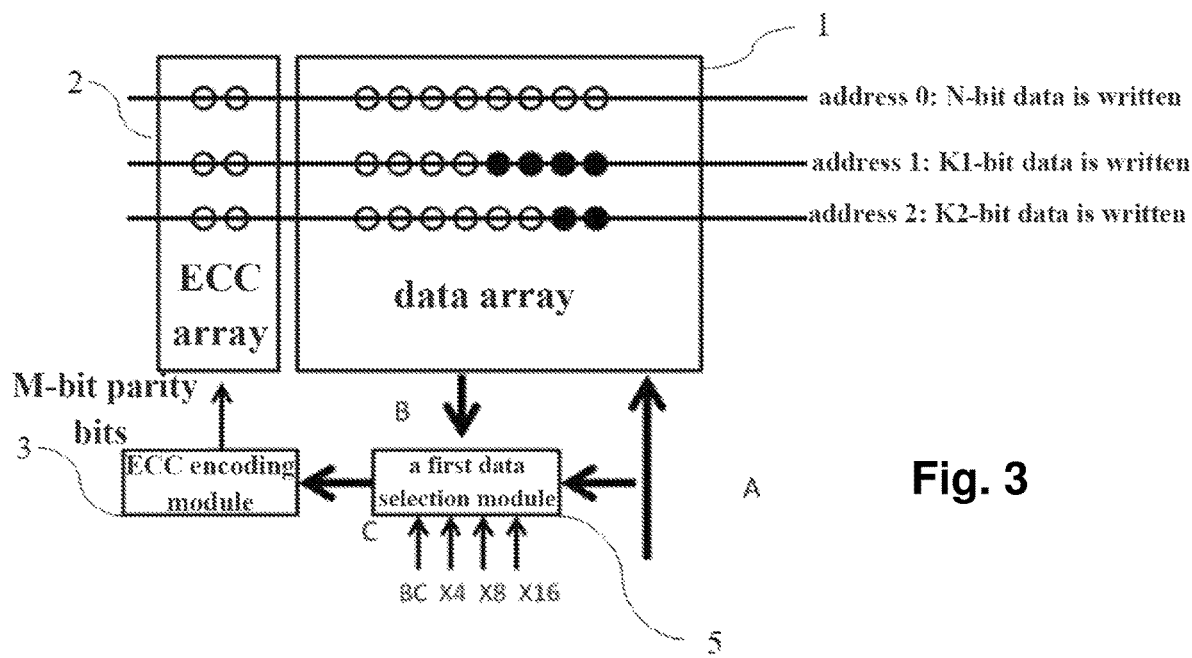
FIG. 3 schematically shows a first kind of write process of the memory with error correction function according to the present invention.
Figure 5:
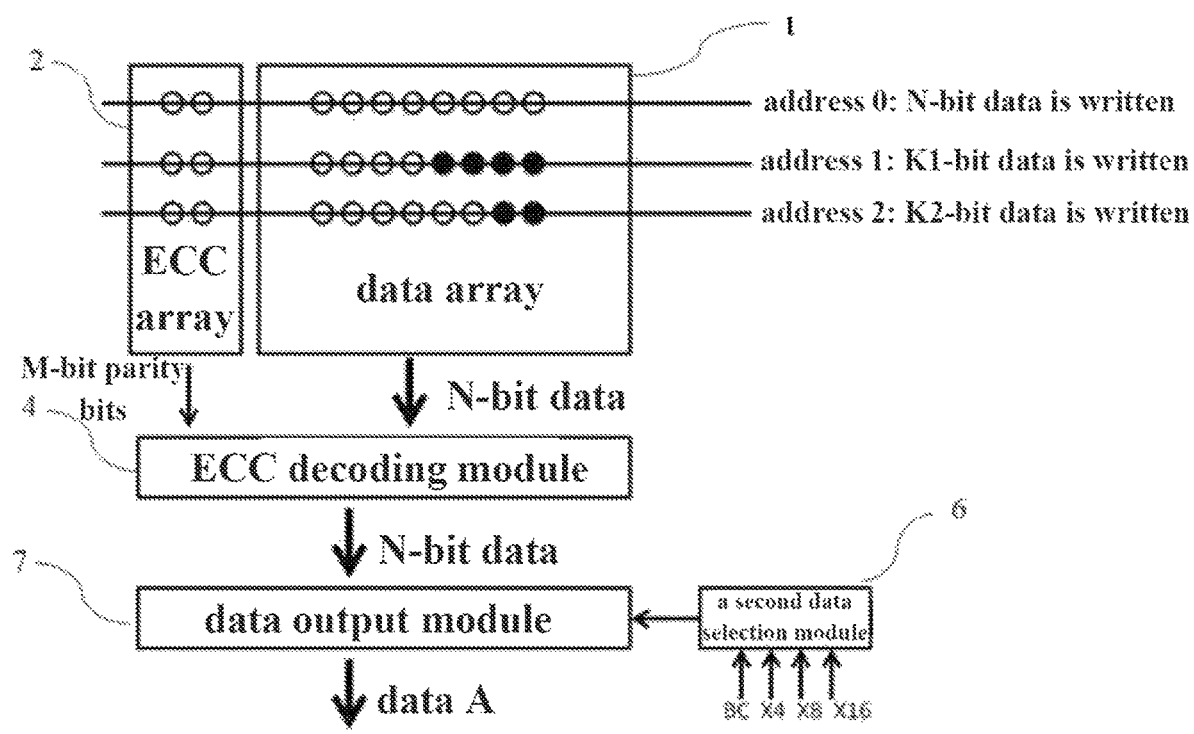
FIG. 5 schematically shows a read process of the memory with error correction function according to the present invention.

The memory with error correction function according to the first aspect of the present invention and the read and write processes of such a memory now will be described in detail with reference to FIGS. 3 and 5.

The memory generally comprises a data array 1, an ECC array 2, an ECC encoding module 3, an ECC decoding module 4, a first data selection module 5, a second data selection module 6 and a data output module 7. When data is being written, those modules perform the following operations: the data array 1 is configured to store the data A to be written; the first data selection module 5 is configured to receive the data A to be written, and in response to a control signal that affects the length of the data (for example, a signal corresponding to X4, X8 or X16 mode or a signal corresponding to the combination of BC mode with one of X4, X8 and X16 modes, as well as any other control signal (not shown) that may affect the length of the data) to determine whether to further receive the data B from the data array 1; the ECC encoding module 3 is configured to receive the data C output from the first data selection module 5, and to encode the data C according to the ECC algorithm preset therein so as to generate parity bits; and the ECC array 2 is configured to store the generated parity bits. When data is being read, those modules performing the following operations: the data array 1 is configured to output the stored data (for example, N-bit data); the ECC array 2 is configured to output the stored parity bits (for example, M-bit parity bits); the ECC decoding module 4 is configured to receive simultaneously the data output from the data array and the parity bits output from the ECC array, so as to detect and correct the data; the second data selection module 6 is configured to generate a control signal for the data output module in response to the control signal that affects the length of the data (for example, a signal corresponding to X4, X8 or X16 mode or a signal corresponding to the combination of BC mode with one of X4, X8 and X16 modes, as well as any other control signal (not shown) that may affect the length of the data); and the data output module 7 is configured to receive the corrected data (for example, N-bit data), and in response to the control signal for the data output module to control the length of the data output from the data output module 7.

More particularly, when data is being written, if the control signal that affects the length of the data is enabled (in other words, if the signal corresponding to X4, X8 or X16 mode or the signal corresponding to the combination of BC mode with one of X4, X8 and X16 modes makes the length of the data A not equal to the data length required by the preset ECC algorithm), the first data selection module 5 further receives the data B from the data array 1, so as to combine the data B from the data array 1 with the data A to be written to construct data required by the ECC algorithm preset in the ECC encoding module 3. For example, assuming that the data length required by the preset ECC algorithm is N bits, if the data A to be written is K-bit data (in other words, if the signal corresponding to X4, X8 or X16 mode or the signal corresponding to the combination of BC mode with one of X4, X8 and X16 modes makes the length of the data A equal to K), the first data selection module 5 further receives (N-K)-bit data from the data array, and combine the K-bit data with the (N-K)-bit data to form N-bit data C required by the ECC algorithm preset in the ECC encoding module 3. As shown in FIG. 3, with respect to address 1, the first data selection module 5 receives K1-bit data (K1=N/2) to be written and further (N-K1)-bit data from the data array; with respect to address 2, the first data selection module 5 receives K2-bit data (K2=3*N/4) to be written and further (N-K2)-bit data from the data array.

If the control signal that affects the length of the data is disabled (in other words, if the signal corresponding to X4, X8 or X16 mode or the signal corresponding to the combination of BC mode with one of X4, X8 and X16 modes makes the length of the data A equal to the data length required by the preset ECC algorithm), without receiving the data B from the data array 1 while merely receiving the data A to be written, the first data selection module 5 is able to output data required by the ECC algorithm preset in the ECC encoding module 3. For example, assuming that the data length required by the preset ECC algorithm is N bits, if the signal corresponding to X4, X8 or X16 mode or the signal corresponding to the combination of BC mode with one of X4, X8 and X16 modes makes the length of the data A equal to N, with merely receiving the data A to be written, the first data selection module 5 is able to output N-bit data C required by the ECC algorithm preset in the ECC encoding module 3. As shown in FIG. 3, with respect to address 0, the first data selection module 5 merely receives the N-bit data A and does not receive the data B from the data array 1.

When data is being read, M-bit parity bits and N-bit data are simultaneously read and sent to the ECC decoding module 4, so as to detect and correct the data. If the control signal for the data output module is enabled (in other words, if the signal corresponding to X4, X8 or X16 mode or the signal corresponding to the combination of BC mode with one of X4, X8 and X16 modes makes the length of the data A not equal to the data length required by the preset ECC algorithm), the length of the data output from the data output module 7 is inconsistent with that required by the ECC algorithm. As shown in FIG. 5, with respect to address 1, the data output module 7 outputs K1-bit data; with respect to address 2, the data output module 7 outputs K2-bit data. When data is being read, if the control signal for the data output module is disabled (in other words, if the signal corresponding to X4, X8 or X16 mode or the signal corresponding to the combination of BC mode with one of X4, X8 and X16 modes makes the length of the data A equal to the data length required by the preset ECC algorithm), the length of the data output from the data output module 7 is consistent with that required by the ECC algorithm. As shown in FIG. 5, with respect to address 0, the data output module 7 outputs N-bit data.

Figure 4:
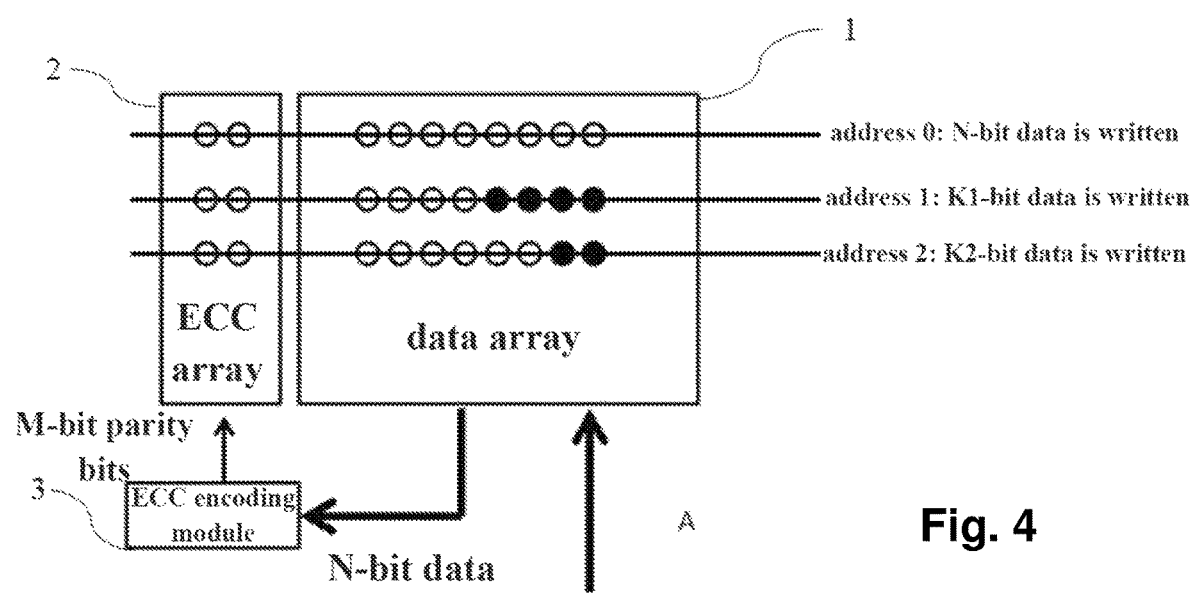
FIG. 4 schematically shows a second kind of write process of the memory with error correction function according to the present invention.

The memory with error correction function according to the second aspect of the present invention and the read and write processes of the memory now will be described in detail with reference to FIGS. 4 and 5. Compared with the memory with error correction function according to the first aspect of the present invention, the memory with error correction function according to the second aspect of the present invention merely differs in write process.

The memory generally comprises a data array 1, an ECC array 2, an ECC encoding module 3, an ECC decoding module 4, a data selection module 6 (which corresponds to the second data selection module according to the first aspect of the present invention) and a data output module 7. When data is being written, those modules perform the following operations: the data array 1 is configured to store the data A to be written; the ECC encoding module 3 is configured to receive the data from the data array (the data length corresponds to that required by the ECC algorithm preset in the ECC encoding module 3, for example N bits), and to encode the data so as to generate parity bits; and the ECC array 2 is configured to store the generated parity bits (for example, M-bit parity bits). When data is being read, those modules perform the following operations: the data array 1 is configured to output the stored data (for example, N-bit data); the ECC array 2 is configured to output the stored parity bits (for example, M-bit parity bits); the ECC decoding module 4 is configured to receive simultaneously the data output from the data array 1 and the parity bits output from the ECC array 2, so as to detect and correct the data; the data selection module 6 is configured to generate a control signal for the data output module in response to the control signal that affects the length of the data (for example, a signal corresponding to X4, X8 or X16 mode or a signal corresponding to the combination of BC mode with one of X4, X8 and X16 modes, as well as any other control signal that may affect the length of the data); and the data output module 7 is configured to receive the corrected data, and in response to the control signal for the data output module to control the length of the data output from the data output module 7.

More particularly, when data is being write, no matter whether the data A to be written is N-bit data or not, the N-bit data input required by the ECC encoding module 3 comes from the data array 1. As shown in FIG. 4, with respect to address 0, address 1 and address 2, the ECC encoding module 3 receives N-bit data.

Since the read process of the memory with error correction function according the second aspect of the present application is same as that of the memory with error correction function according to the first aspect of the present application, it is not described in detail here.

It should be noted that address 0, address 1 and address 2 mentioned above are only for indicating different addresses, rather than the actual addresses 0, 1 and 2 in the memory. The data length which is inconsistent with N is not limited to two lengths K1=N/2 and K2=3*N/4, and any other data length which is inconsistent with N is suitable.

The above description of the present invention is not intended to be exhaustive or to limit the invention to the precise forms disclosed. Although specific embodiments and examples of the present invention are described herein for illustrative purposes, there may be many equivalent modifications, without departing from the sprits and scope of the invention. The word "comprising" does not exclude the presence of elements or steps other than those listed in a claim, "a" or "an" does not exclude a plurality, and a single feature or other unit may fulfill the functions of several units recited in the claims. Any reference signs in the claims shall not be construed so as to limit their scope.

The invention claimed is:

1. A memory with error correction function, comprising: a data array, an ECC array, an ECC encoding module, an ECC decoding module, a first data selection module, a second data selection module and a data output module;
   wherein when writing data, the data array is configured to store a first data; the first data selection module is configured to receive the first data, and in response to a control signal that affects the length of the data to determine whether to further receive a second data from the data array; the ECC encoding module is configured to receive the data output from the first data selection module, and to encode the data according to the ECC algorithm preset therein so as to generate parity bits; and the ECC array is configured to store the generated parity bits;
   when reading data, the data array is configured to output the stored data; the ECC array is configured to output the stored parity bits; the ECC decoding module is configured to receive simultaneously the data output from the data array and the parity bits output from the ECC array, so as to detect and correct the data; the second data selection module is configured to generate a control signal for the data output module in response to the control signal that affects the length of the data; and the data output module is configured to receive the corrected data, and in response to the control signal for the data output module to control the length of the data output from the data output module.

2. The memory of claim 1, wherein the control signal that affects the length of the data is a signal corresponding to X4, X8 or X16 mode or a signal corresponding to the combination of burst chop mode with one of X4, X8 and X16 modes.

3. The memory of claim 2, wherein when writing data, if the control signal that affects the length of the data is enabled, the first data selection module further receives the second data from the data array, so as to combine the second data from the data array with the first data to construct data required by the ECC algorithm preset in the ECC encoding module; when writing data, if the control signal that affects the length of the data is disabled, without receiving the second data from the data array while merely receiving the first data, the first data selection module is able to output data required by the ECC algorithm preset in the ECC encoding module.

4. The memory of claim 2, wherein when reading data, if the control signal for the data output module is enabled, the length of the data output from the data output module is inconsistent with that required by the ECC algorithm; when reading data, if the control signal for the data output module is disabled, the length of the data output from the data output module is consistent with that required by the ECC algorithm.

5. The memory of claim 1, wherein when writing data, if the control signal that affects the length of the data is enabled, the first data selection module further receives the second data from the data array, so as to combine the second data from the data array with the first data to construct data required by the ECC algorithm preset in the ECC encoding module; when writing data, if the control signal that affects the length of the data is disabled, without receiving the second data from the data array while merely receiving the first data, the first data selection module is able to output data required by the ECC algorithm preset in the ECC encoding module.

6. The memory of claim 1, wherein when reading data, if the control signal for the data output module is enabled, the length of the data output from the data output module is inconsistent with that required by the ECC algorithm; when reading data, if the control signal for the data output module is disabled, the length of the data output from the data output module is consistent with that required by the ECC algorithm.

7. A method of correcting errors in a memory, wherein the memory comprises: a data array, an ECC array, an ECC encoding module, an ECC decoding module, a first data selection module, a second data selection module and a data output module, the method of correcting errors in the memory comprising:
   when writing data, storing a first data in the data array; receiving the first data by the first data selection module, and determining whether to further receive the second data from the data array by the first data selection module in response to a control signal that affects the length of the data; receiving the data output from the first data selection module by the ECC encoding module, and encoding the data by the ECC encoding module according to the ECC algorithm preset therein so as to generate parity bits; and storing the generated parity bits in the ECC array;
   when reading data outputting the stored data from the data array; outputting the stored parity bits from the ECC array; receiving simultaneously the data output from the data array and the parity bits output from the ECC array by the ECC decoding module, so as to detect and correct the data; generating a control signal for the data output module by the second data selection module in response to the control signal that affects the length of the data; and receiving the corrected data by the data output module, and in response to the control signal for the data output module, controlling the length of the data output from the data output module.

8. The method of correcting errors in a memory of claim 7, wherein the control signal that affects the length of the data is a signal corresponding to X4, X8 or X16 mode or a signal corresponding to the combination of burst chop mode with one of X4, X8 and X16 modes.

9. The method of correcting errors in a memory of claim 8, wherein when writing data, if the control signal that affects the length of the data is enabled, the first data selection module further receives the second data from the data array, so as to combine the second data from the data array with the first data to construct data required by the ECC algorithm preset in the ECC encoding module; when writing, if the control signal that affects the length of the data is disabled, without receiving the second data from the data array while merely receiving the first data, the first data selection module is able to output data required by the ECC algorithm preset in the ECC encoding module.

10. The method of correcting errors in a memory of claim 8, wherein when reading data, if the control signal for the data output module is enabled, the length of the data output from the data output module is inconsistent with that required by the ECC algorithm; when reading data, if the control signal for the data output module is disabled, the length of the data output from the data output module is consistent with that required by the ECC algorithm.

11. The method of correcting errors in a memory of claim 7, wherein when writing data, if the control signal that affects the length of the data is enabled, the first data selection module further receives the second data from the data array, so as to combine the second data from the data array with the first data to construct data required by the ECC algorithm preset in the ECC encoding module; when writing data, if the control signal that affects the length of the data is disabled, without receiving the second data from the data array while merely receiving the first data, the first data selection module is able to output data required by the ECC algorithm preset in the ECC encoding module.

12. The method of correcting errors in a memory of claim 7, wherein when reading data, if the control signal for the data output module is enabled, the length of the data output from the data output module is inconsistent with that required by the ECC algorithm; when reading data, if the control signal for the data output module is disabled, the length of the data output from the data output module is consistent with that required by the ECC algorithm.

* * * * *